United States Patent [19]
Roskam et al.

[11] Patent Number: 5,908,992
[45] Date of Patent: Jun. 1, 1999

[54] ULTRASOUND FLOW MEASUREMENT METHOD

[75] Inventors: Abram Klaas Roskam, Sleeuwijk; Jan Aart van Bekkum, Hoomaar; Vladimir Smychliaev, Dordrecht, all of Netherlands

[73] Assignee: Krohne AG, Switzerland

[21] Appl. No.: 09/067,364

[22] Filed: Apr. 27, 1998

[30] Foreign Application Priority Data

Apr. 29, 1997 [DE] Germany .......................... 197 17 940

[51] Int. Cl.$^6$ ....................................................... G01F 1/66
[52] U.S. Cl. ..................................... 73/861.27; 73/861.29
[58] Field of Search ........................... 73/861.27, 861.28, 73/861.29, 861.31, 861.18

[56] References Cited

U.S. PATENT DOCUMENTS 5,546,812   8/1996   Drenthen .............................. 73/861.29

*Primary Examiner*—Elizabeth L. Dougherty
*Attorney, Agent, or Firm*—Cesari and McKenna, LLP

[57] ABSTRACT

The invention concerns and ultrasound flow rate measurement method by means of a measuring tube and at least two pairs of ultrasound transducers located on the measuring tube, in each case forming a measuring path, whereby the radial components of at least two measuring paths deviate from each other with respect to the axis of the measuring tube and in the case of which the measured value for the rate of flow of a flowing medium is determined from the velocity of the medium along at least two measuring paths. In accordance with the invention an ultrasound flow measuring method of this kind is further developed in that the eddy intensity in the medium is determined from the velocities of the medium along the measuring paths, the relation between angular momentum and axial momentum enters into the determination of the eddy intensity at least approximately, and the measured value for the rate of flow is corrected by means of the eddy intensity.

5 Claims, 5 Drawing Sheets

ULTRASOUND FLOW MEASUREMENT METHOD

The invention concerns an ultrasound flow rate measurement method by means of a measuring tube and at least two pairs of ultrasound transducers located on the measuring tube, in each case forming a measuring path, the radial components of at least two measuring paths deviating from each other with respect to the axis of the measuring tube and in the case of which the measured value for the rate of flow of a flowing medium is determined from the velocity of the medium along at least two measuring paths.

BACKGROUND OF THE INVENTION

The starting point for the present invention is the fact that the flow conditions in pipelines of industrial facilities in all cases are far from ideal, rather they are more or less highly disturbed. Disturbances in the flow conditions are generally in the form of asymmetries of the axial flow velocities of the medium over the cross-section of a pipeline, eddies, i.e. radial velocity components of the medium, and pressure waves within the medium. The asymmetries are caused, for example, by half-closed valves or other components in the cross-section of the pipeline, the eddies arising essentially as a result of bends, in particular sequential bends in different planes, but also on T-junctions within the pipeline system. Pressure waves within the medium are triggered above all by pumps, and also, for example, by changes in the degrees of opening of valves within the adjacent pipelines.

The simplest methods for ultrasound flow rate measurement operate only by means of a pair of ultrasound transducers located on the measuring tube, forming a measuring path. In the case of this ultrasound flow rate measurement method, the measured value for the rate of flow of the medium is determined from the differences in the propagation time of the ultrasound signals along the measuring path upstream and downstream. The measured value for the rate of flow in this case is determined via a constant correction factor, or via a correction factor dependent on the velocity of the medium along the measuring path, from the velocity of the medium along the measuring path. In the case of an ultrasound flow measuring method of this kind, it is not possible to take account of the above-mentioned disturbances of the flow conditions.

The published application PCT/EP 96/05082 discloses an ultrasound flow rate measurement method which compensates for the disturbance of the flow conditions by means of asymmetries of the axial velocities of the medium over the cross-section of the measuring tube essentially by mounting at least two pairs of ultrasound transducers forming a measuring path on the measuring tube, by determining the Reynolds' number along the measuring path from the values for the velocity of the medium along the measuring path, and by correcting the measured value for the rate of flow by means of the value for the Reynolds' number. However, this method also allows the measuring accuracy to be impaired by eddies within the medium.

However, the degree of influence of eddies within the medium represents a very considerable problem with respect to the measurement accuracy of the ultrasound flow measuring method. The disturbances of the flow conditions caused by eddies are particularly troublesome because, on the one hand, eddies present also influence the flow profile of the medium in the axial direction and, on the other hand, die out very slowly. These above-mentioned properties of the eddies are shown particularly clearly from the experimentally determined measurement curves in FIG. 1 of the drawing. FIG. 1 shows the flow conditions of flowing media with Reynolds' numbers of 50,000 and 300,000 in relation to the length of the inlet section, with respect to the diameter with the pipeline. Here, U designates the axial velocity of the medium, while W designates the tangential velocity of the medium, depending on the distance from the measuring tube axis. It is also seen clearly that the eddies have not died down completely after an inlet section with a length corresponding to around 80 times the diameter of the pipeline. Depending on the respective conditions, eddies can also clearly still impair the measurement accuracy even after an inlet section with a length which corresponds to 100 times and more of the pipeline diameter (cf. also the publication "Turbulent Pipe Flow with Swirl", Wendelt Steenbergen, Eindhoven, Eindhoven University of Technology, 1995).

In order to reduce the influence of eddies on the measurement of the rate of flow of a medium, among other things, it has been proposed that a flow equalizer be inserted into the pipeline. However, a flow equalizer of this kind entails problems in that, on the one hand, it causes a clear pressure loss, and, on the other hand, it does not completely eliminate the eddies. Also, flow equalizers cannot be used in connection with flowing media which have a certain portion of solids, since in such a case the flow equalizer would be obstructed within a short time.

EP 0 639 776 A1, on which the invention is based, concerns an ultrasound flow measuring method in the case of which the influence of eddies within the medium on the measured value for the rate of flow is reduced by the fact that the velocities of the medium are measured along two measuring paths with different sensitivities with respect to the eddies. The different sensitivities are provided by the fact that radial components of the measuring paths deviate from one another with respect to the measuring tube axis. In this case the measuring paths pass in such a way that the velocities along the measuring paths are identical when there are no eddies present within the measuring tube, while the difference of the velocities along the measuring paths does not disappear when the flow includes eddies. In the case of the known method, the measured value for the rate of flow of the medium through the measuring tube is corrected by means of this difference in the velocities. The known method is problematic in two regards. On the one hand the difference of the velocities of the medium along the two measuring paths with different sensitivities to eddies has a very considerable cross-sensitivity to disturbances as a result of pressure waves within the medium, as was determined experimentally. Here also the increase in the measurement frequency proposed in EP 0 639 776 A1 does not solve the problem. Since disturbances as a result of pressure waves of course require a different correction of the measured value for the rate of flow than disturbances for eddies, the measured value for the rate of flow cannot be corrected satisfactorily by means of the difference determined in the prior art, if, as is regularly the case, pressure waves impair the flow conditions. On the other hand, eddies, as shown in FIG. 1, are regularly asymmetrical. Such an asymmetry is not taken into account in the case of the known method for ultrasound flow rate measurement.

SUMMARY OF THE INVENTION

Therefore, on the basis of the discussed prior art, the object of the invention is to configure and further develop the known ultrasound flow measuring method in such a way that a correction of the rate of flow can be carried out in such a way that the accuracy of measurement for the rate of flow is clearly improved in the case of flow conditions which are disturbed by eddies.

The object derived and indicated above is achieved in accordance with the invention by means of the fact that the eddy intensity in the medium is determined from the velocities of the medium along the measuring paths, that the relation between the angular momentum and axial momentum of the medium enters into the determination of the eddy intensity at least approximately, and that the measured value for the rate of flow is corrected by the eddy intensity. The calculation of the eddy intensity in accordance with the invention on the basis of the relation between angular momentum and axial momentum of the medium in the first place largely eliminates the cross-sensitivity of the value for the eddy intensity with respect to disturbances of the flow conditions as a result of pressure waves. Consequently, with the method configured in accordance with the invention it is possible to perform a cleaner correction of the measured value for the rate of flow on the basis of the calculated eddy intensity. In addition, the ultrasound flow measuring method in the configuration in accordance with the invention also takes account of asymmetries of the eddies. As a result a very good correction of the measured value for the rate of flow can be performed in spite of flow conditions within the medium disturbed by eddies.

Since the flow conditions of the medium in the measuring tube are accessible to an analytical evaluation only with great difficulty, the method in accordance with the invention is further improved as a result of the fact that the correction of the measured value for the rate of flow is carried out by means of the eddy intensity with the use of an error curve relying on empirical data. Such an empirical error curve takes into account, on the one hand, existing systematic interconnections and, on the other hand, specific properties of a device for implementing the method in accordance with the invention.

It has been shown in experiments that for compensating the disturbance of the flow conditions as a result of eddies it is sufficient if the angular momentum of the medium is determined at least approximately from the difference or the sum of at least two differences of the velocities of the medium along two measuring paths with radial components deviating from one another along the axis of the measuring tube. This determination of the angular momentum is very simple and thus can be carried out without great equipment expenditure. The error in determining the angular momentum of the medium is reduced by taking account of the sum of at least two differences.

If the absolute values of the differences of the velocities of the medium along two measuring paths are used to determine at least approximately the angular momentum of the medium, the differences of the velocities of the medium along two measuring paths can be determined by means of any measuring paths in any sequence.

Also, in order to simplify the necessary determination of the axial momentum of the medium, the method in accordance with the invention is further developed by determining the axial momentum of the medium at least approximately from the velocity of the medium along a measuring path or the sum of the velocities of the medium along several measuring paths. Also, from this embodiment of the method in accordance with the invention it becomes clear again that the method in accordance with the invention with very simple configurations makes it possible to improve the measuring accuracy significantly. Also, taking account of the sum of the velocities leads to some increased measurement accuracies for the eddy intensity.

BRIEF DESCRIPTION OF THE DRAWINGS

In particular, there are now a number of possibilities for designing and further developing the ultrasound flow measuring method in accordance with the invention. These are indicated, on the one hand, in the dependent claims and, on the other hand, in the description in connection with the drawing. In the drawing

DESCRIPTION OF THE PREFERRED EMBODIMENT

Figure 1:
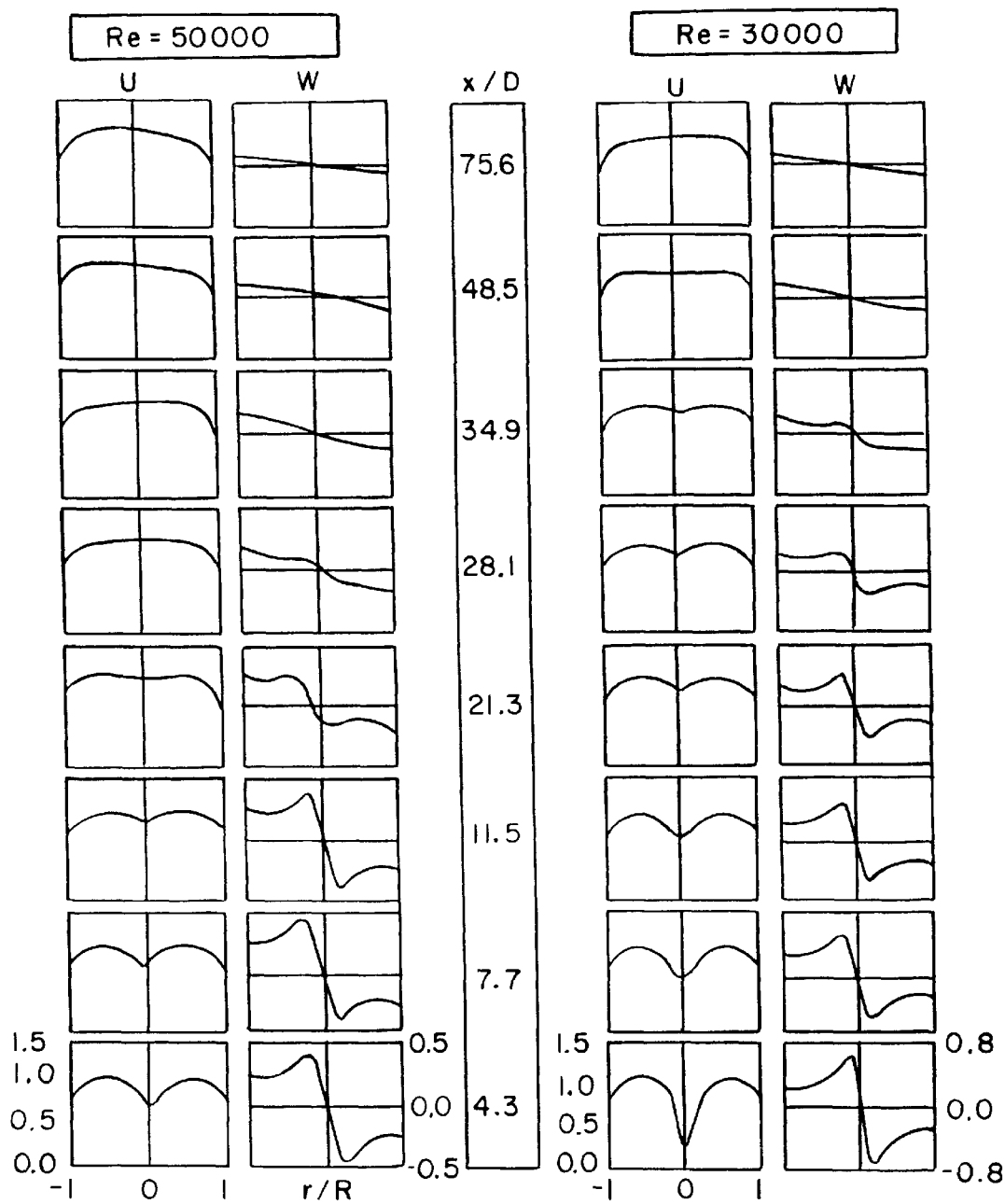
FIG. 1 shows the flow conditions of a flow media with Reynolds' numbers of 50,000 and 300,000 in relation to the length of the inlet section, with respect to the diameter of the pipeline.

Some theoretical statements for explaining the principle of the invention are presented next below.

For the velocity of the medium along a measuring path $U_m$, which does represent the velocity along the measuring path, it is valid that it is a function of the course of the measuring path, symbolized here by the coordinate x relative to the radius R of the measuring tube, the Reynolds' number Re and the eddy intensity S, that is:

$$U_m = f\left(\frac{x}{R}, Re, S\right) \qquad \text{Equation 1}$$

For the average velocity $\overline{U}$ over the entire cross-section of the measuring tube then the following is valid:

$$\overline{U} = \frac{2}{\pi R^2} \int_{-R}^{R} 2\sqrt{R^2 - x^2}\, U_m\left(\frac{x}{R}, Re, S\right), dx \qquad \text{Equation 2}$$

Since in the case of all known ultrasound flow measuring methods the average velocities $U_m$ are known only along a limited number of measuring paths, in practice the average velocity is calculated over the cross-section of the measuring tube as follows:

$$\overline{U} = \sum_{i=1}^{N} G_i U_{m_i} + \varepsilon(Re) + \delta(S) \qquad \text{Equation 3}$$

where
 $G_i$ is the weight factor associated with each measuring path, $U_{m_i}$ is the averaged velocity along the i-th measuring path,
$\epsilon[Re]$ describes the influence of the Reynold's number, and $\delta(S)$ describes the influence of the eddy intensity.

The published application PCT/EP 96/05082 is referred to for the treatment of $\epsilon(Re)$ The goal of the present invention is to eliminate the influence $\delta(S)$ of the eddy intensity in the medium on the measuring accuracy for $\overline{U}$ as much as possible. For this purpose it is necessary first to determine the eddy intensity S and second to determine its influence on the velocity determined over the entire cross-section of the measuring tube.

The statement in accordance with the invention consists in the fact that the relation between angular momentum and axial momentum of the medium enters into the determination of the eddy intensity in the medium at least approximately. Correspondingly, the eddy intensity S can be defined as follows:

$$S = \frac{M_{mn}}{J_{axial} \cdot R} = \frac{2\pi\rho \int_0^R r^2 U W \, dr}{\rho\pi R^2 U^2_m R} \quad \text{Equation 4}$$

where
$M_{mn}$ is the angular momentum of the medium,
$J_{axial}$ is the axial momentum of the medium,
$\rho$ is the axial momentum of the medium,
U is the axial velocity component of the medium,
W is the tangential velocity component of the medium and
r is the radial distance from the measuring tube axis.

This theoretical statement is based on an exact consideration of the relation of angular momentum and axial momentum of the flowing medium.

Equation 4 now can be simplified by using the so-called "solid body" approximation, which is as $$W = r \cdot \omega \quad \text{Equation 5}$$

follows:
where
$\omega$ is the angular velocity

The "solid body" approximation is based on the fact that the medium rotates with the same angular velocity as a solid body. With the above-mentioned approximation the following is valid for the eddy intensity:

$$S = \frac{\omega \cdot R}{2 U_m} \quad \text{Equation 6}$$

Figure 2:
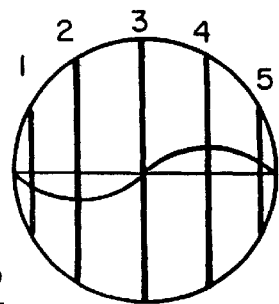
FIG. 2 shows a graphic representation of the tangential velocity components in a medium in the case of the presence of a symmetrical eddy and the projection of measuring paths onto the cross-section of a measuring tube.

Under the assumption that the measuring paths are arranged symmetrically over the cross-section of the measuring tube and that the inlet section in front of the measuring tube is sufficiently long, the flow profile of the axial velocities and the tangential velocities is axially symmetrical. This case is shown in FIG. 2. Under the assumption that at least the axial velocities are axially $$\Delta T_{left} + \Delta T_{right} = \quad \text{Equation 7}$$
$$\frac{4\cos\theta}{c^2} \int_0^{L_i} U \, dl_i + \frac{2\sin\theta}{c^2} \int_0^{L_i} (W_{right} - W_{left}) \, dl_i$$

symmetrical, the following is valid for the sum of the measured running time differences along two measuring paths with radial components deviating from one another with respect to the measuring tube axis:

$\Delta T_{left}$ and $\Delta T_{right}$ are the running time differences in the left and in the right halves of the measuring tube along two measuring paths with radial components deviating from one another with respect to the measuring tube axis, c is the ultrasound velocity in the flowing medium, $\theta$ is the angle of inclination of the measuring path to the measuring tube axis, and $L_i$ is the length of the i-th measuring path.

For the case just discussed and shown in FIG. 2, that the eddy is symmetrical, it is valid that:

$$W_{right} = W_{left} \quad \text{Equation 8}$$

where $W_{right}$, as the case may be $W_{left}$, are the tangential components of the velocity of the flowing medium in the left, as the case may be right, halves of the measuring tube.

In this case the second integral in Equation 7 disappears. Thus the second integral in Equation 7 is a measure of the asymmetry of the eddy.

The following is valid for the difference of the running time difference along two measuring paths passing in the right and left halves of the measuring tube with radial components deviating from one another with respect to the measuring tube axis:

$$\Delta T_{right} - \Delta T_{left} = \frac{2\sin\theta}{c^2} \int_0^{L_i} (W_{right} + W_{left}) \, dl_i \quad \text{Equation 9}$$

Thus the following is valid for the ratio of the differences of the running time difference and the sums of the running time differences, therefore Equation 9 and 7:

$$\frac{\Delta T_{right} - \Delta T_{left}}{\Delta T_{right} + \Delta T_{left}} = \frac{2r \cdot tg\theta \int_0^{L_i} (W_{right} + W_{left}) \, dl_i}{r\left[4\int_0^{L_i} U \, dl_i + 2 tg\theta \int_0^{L_i} (W_{right} - W_{left}) \, dl_i\right]} \quad \text{Equation 10}$$

If one assumes that the difference between $W_{right}$ and $W_{left}$ is small in the case of correspondingly long inlet sections, the following approximation is valid:

$$\frac{tg\theta \int_0^{L_i} (W_{right} - W_{left}) \, dl_i}{2\int_0^{L_i} U \, dl_i} \ll 1 \quad \text{Equation 11}$$

Thus the following is valid after inserting the approximation from Equation 11 and reusing the "solid body" equation in Equation 10 for the ratio from the difference of the running time differences and the sum of the running time differences:

$$\frac{\Delta T_{right} - \Delta T_{left}}{\Delta T_{right} + \Delta T_{left}} = \frac{R\omega}{4U} tg\theta = S \cdot tg\theta \quad \text{Equation 12}$$

Therefore it is recognized that the eddy intensity defined via the ratio of angular momentum and axial momentum in first approximation corresponds to the ratio of the difference of the running time differences and the sum of the running time differences with a constant factor. In addition, since the following is valid:

$$\frac{(\Delta T_{right} - \Delta T_{left})}{(\Delta T_{right} + \Delta T_{left})} = \frac{(\Delta U_{m_{right}} - \Delta U_{m_{left}})}{(\Delta U_{m_{right}} + \Delta U_{m_{left}})} \qquad \text{Equation 13}$$

therefore the eddy intensity can be measured uniformly from the velocities of the medium along at least two measuring paths with radial components deviating from one another with respect to the measuring tube axis and used for correcting the measured value for the rate of flow. Asymmetries are taken into account in Equation 13 via the sum of the running time differences ($\Delta T_{right} + \Delta T_{left}$).

As already mentioned, Equation 13 can also be further developed to the effect that not only is a difference in the velocities of the medium along two measuring paths with radial components deviating from one another with respect to the measuring tube axis taken into account, but, in addition, the sum of two or more differences in determining the angular momentum of the medium is taken into account. Moreover, the measurement accuracy for the eddy intensity is increased further by the fact that also the axial momentum of the medium is determined by means of the sum of the velocities of the medium along several measuring paths. For example, it is conceivable for the following circumstances to occur. In the case of two measuring paths Equation 13 is offered in unchanged form. In the case of three measuring paths the eddy intensity can be determined, for example, by means of the ratio of the differences of the velocities between the measuring paths 1 and 3 or 1 and 2 or 2 and 3 and the sum of the velocities on the measuring paths 1 to 3. If four measuring paths are provided within the measuring tube, the eddy intensity can be determined by means of the differences of the velocities along the measuring paths 2 and 4 or 1 and 4 or 2 and 3, divided by the sum of the velocities along the measuring paths 1 to 4. Alternatively, the eddy intensity can be determined from the sum of the differences of the velocities along the measuring paths 2 and 4 and 1 and 4, divided by the sum of the velocities along the measuring paths 1 to 4. Also conceivable are arrangements with five measuring paths, in the case of which the eddy intensity is determined for example by the sum of the differences of the velocities along the measuring paths 2 and 4, and 1 and 5, divided by the sum of the velocities along the measuring paths 1 to 5.

However, it is also sufficient to determine the eddy intensity by means of the quotient of the difference of the velocities along the measuring paths 1 and 5 and the sum of the velocities along the measuring paths 1 to 5. There are a number of conceivable equations for determining the eddy intensity in accordance with the invention as an alternative to the possibilities enumerated here.

In order for the quotient of the differences and the sums of the velocities of the medium to be proportional to the eddy intensity along two measuring paths, the radial components of both measuring paths relative to the measuring tube axis must be different from each other. The radial component of the measuring path with respect to the measuring tube axis means the angular coordinate of a vector pointing in the direction of the measuring path in a cylindrical coordinate system with the measuring path axis as the middle axis. The deviation has to be realized either in the absolute value or in the sign of the radial component. For the case where the radial components agree, the difference of the running time differences provides only a measure of the asymmetry of the eddy, so that in this case Equation 13 would not represent a measure of the eddy intensity.

The known arrangements for realizing ultrasound flow rate measurement methods are designed so that the measuring paths pass more or less uniformly distributed over the cross-section of the measuring tube in a common plane inclined with respect to the measuring tube axis. In these known arrangements in each case two measuring paths passing on different sides of the measuring tube axis fulfill the requirement for radial components deviating from one another with respect to the measuring tube axis for realizing the method in accordance with the invention.

For correcting the measured value for the rate of flow or the velocity determined over the cross-section of the measuring tube in accordance with function 3, the function $\delta(S)$ now also is omitted. Thus function $\delta(S)$ is determined empirically according to a further development of the method in accordance with the invention, since it is largely excluded from an analytical evaluation.

Figure 3:
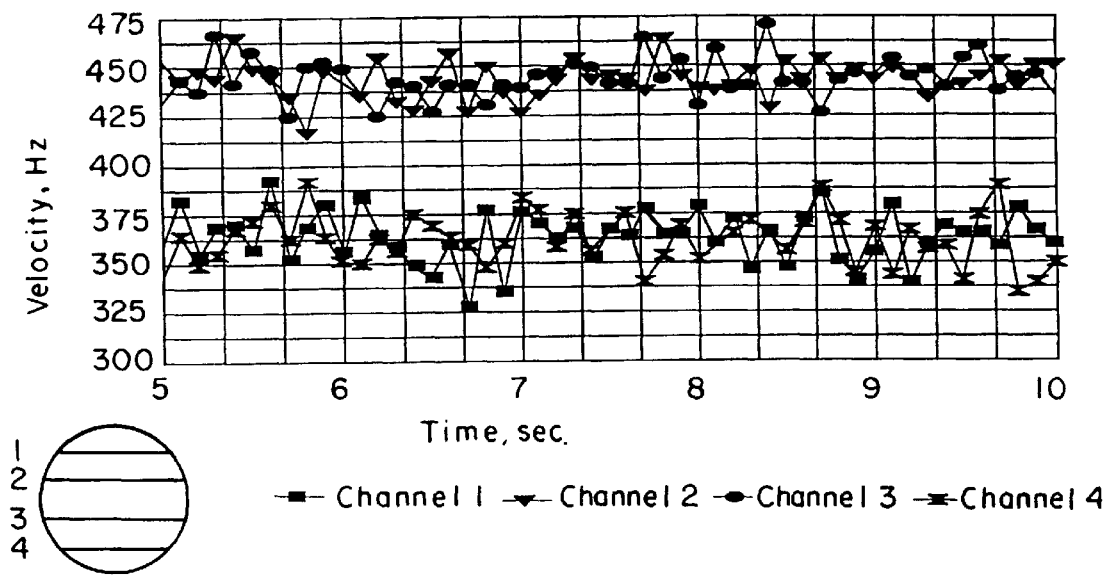
FIG. 3 shows a graphic representation of the velocities of the medium on four measuring paths in the case of a disturbance of the flow conditions by pressure waves.

It is a particular advantage of the method in accordance with the invention, and explained above mathematically, that the cross-sensitivity of the correction of the measured value for the flow rate to disruptions of the flow rate by pressure waves is lowered depending on the eddy intensity. FIG. 3 shows the velocities of the medium along four measuring paths, the position of the measuring path resulting from the cross-section through the measuring tube being shown on the lower left of the diagram. The measured values shown in FIG. 3 are found in the case of measurements within a medium, the flow conditions of which are disturbed exclusively by pressure waves. It is seen here directly that the fluctuations in the velocities along the measuring paths caused by pressure waves can be changed directly with the influence of eddies. Relatively high differences of the velocities along the measuring paths with radial components deviating from one another, for example measuring paths 1 and 4 or 2 and 3 appear distributed randomly, which in the case of the method known from the prior art, on which the invention depends, are interpreted to the effect that the flow conditions are disturbed by eddies, and correspondingly the measured values for the rate of flow are to be corrected.

Figure 4:
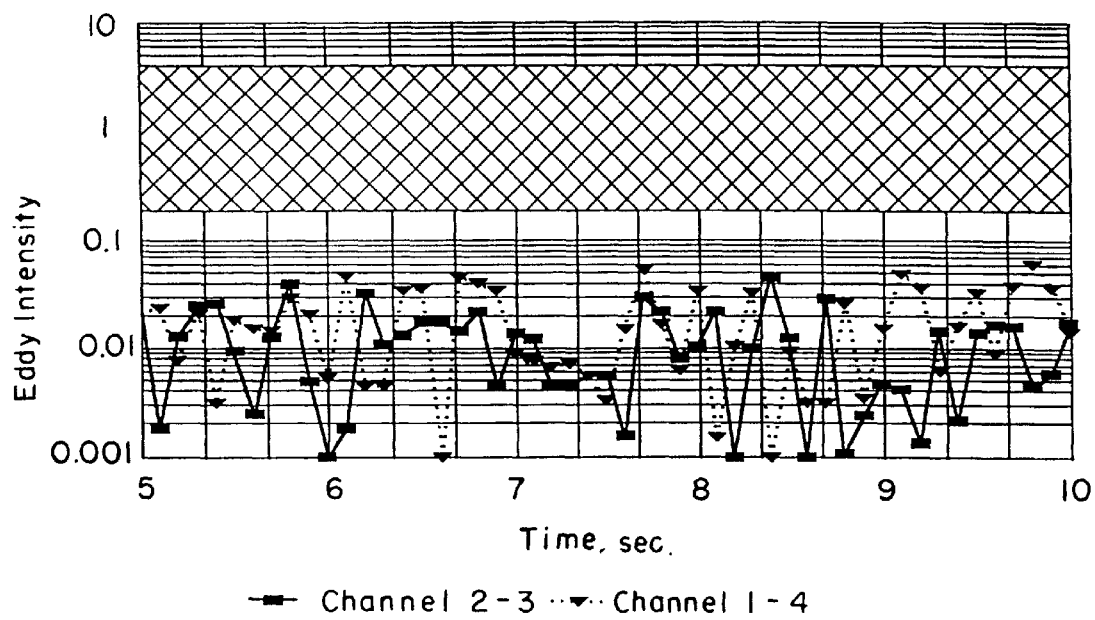
FIG. 4 shows a graphic representation of the conditions of the influence of disturbances by pressure waves and disturbances by eddies on the eddy intensity determined in accordance with the invention, FIGS. 5a), b) shows a graphic representation of a correction of a flow profile disturbed by eddies in the case of the determination of the velocities of the medium along five measuring paths.

Further, FIG. 4 shows the influence of pressure waves and the influence of eddies on the eddy intensity determined in accordance with the invention. Here we see clearly that the influence of pressure waves on the eddy intensity determined in accordance with the invention, shown in detail in the form of two measuring curves, is around an order of magnitude below the area of influence of eddies, shaded with diagonal lines, within the medium on the eddy intensity determined in accordance with the invention. FIG. 4 also clearly shows the already repeatedly mentioned, clearly reduced cross-sensitivity of the eddy intensity with respect to pressure waves defined in accordance with the invention.

Figure 5A:
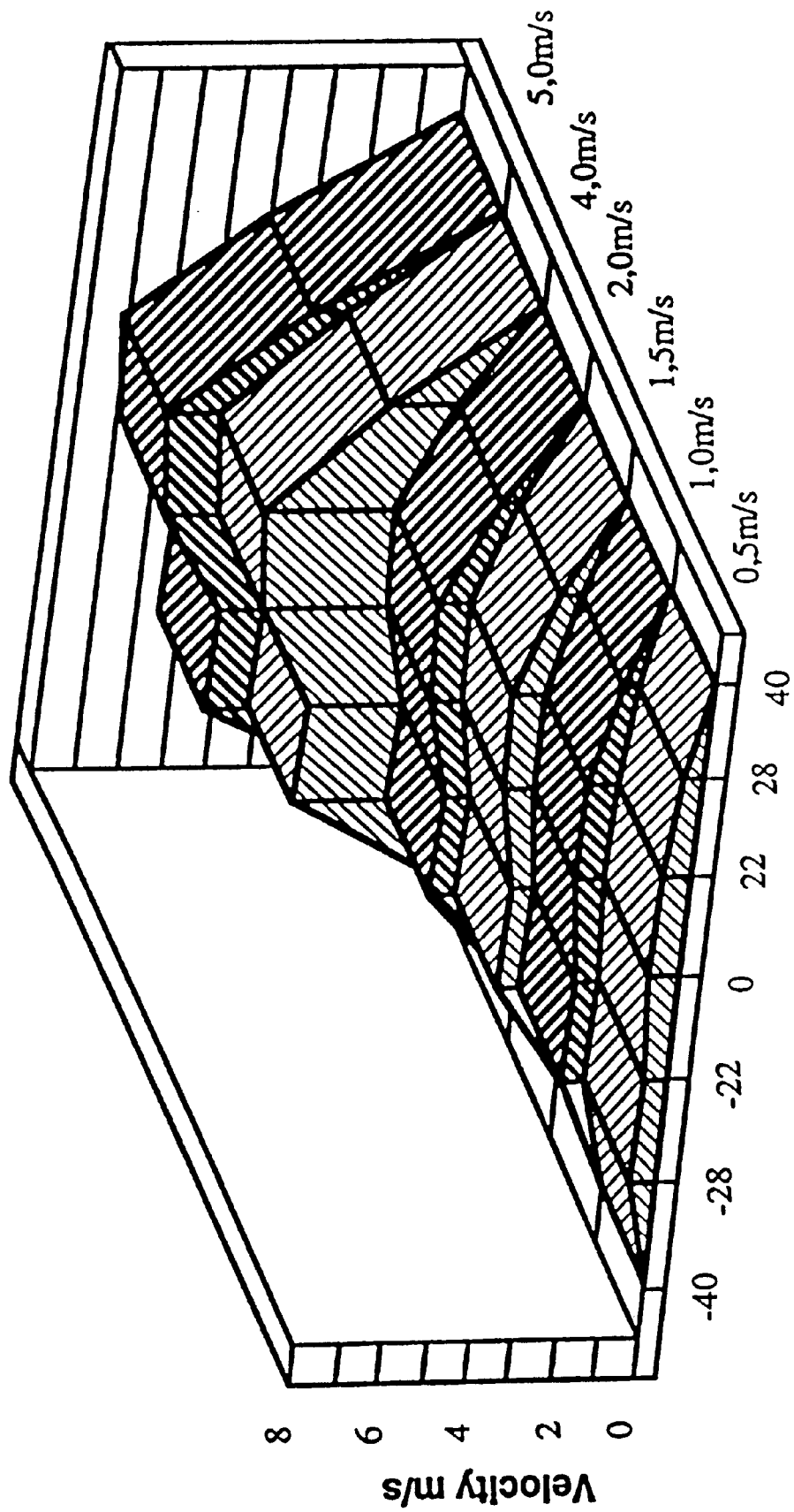
Figure 5B:
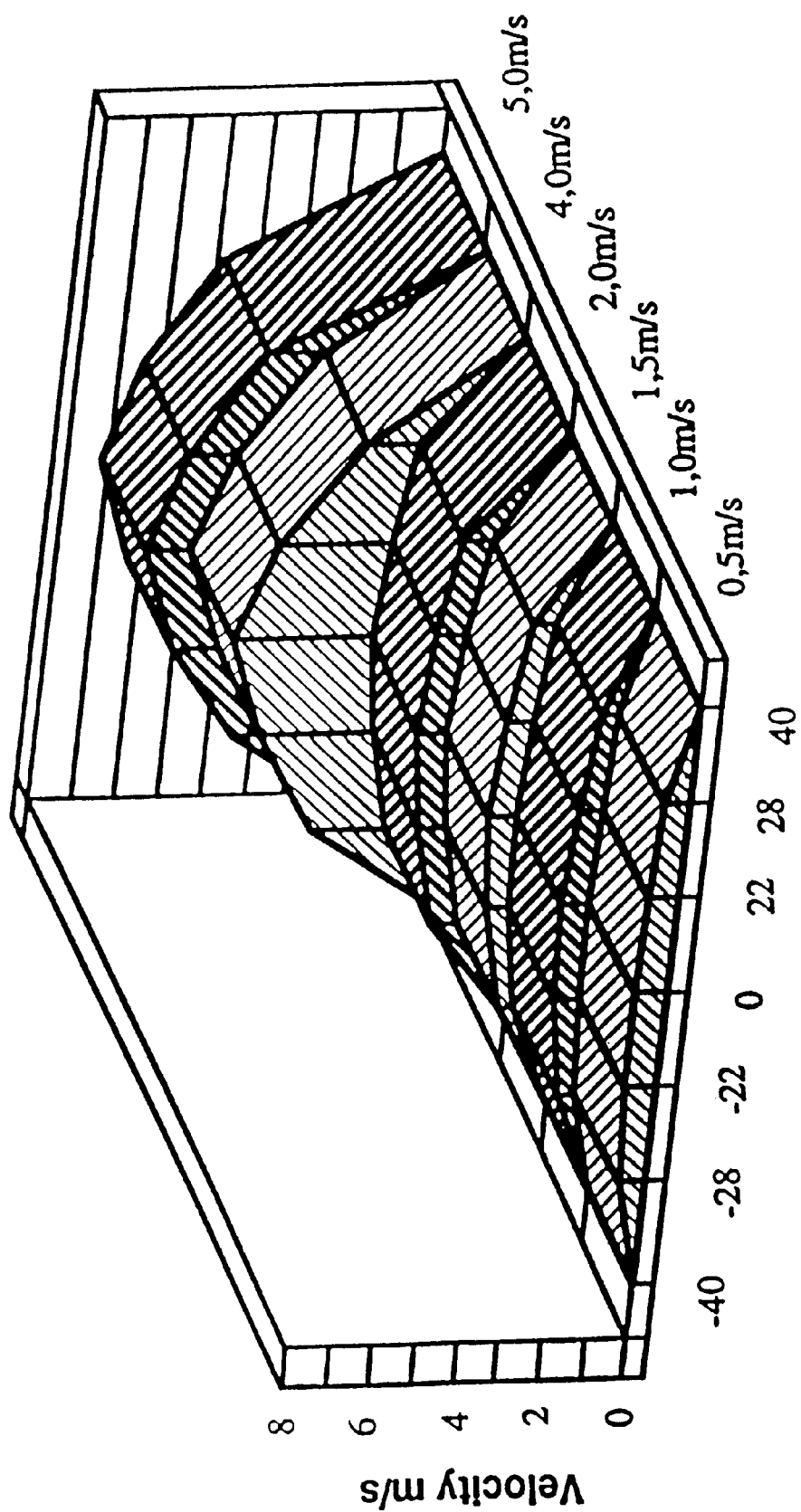

FIG. 5a) shows an uncorrected flow profile, recorded with five pairs of ultrasound transducers, with a clear eddy influence. As compared with this, FIG. 5b) shows the same flow profile, corrected by means of the eddy intensity determined in accordance with the invention. It is clear that the flow profile shown in FIG. 5a) has been symmetrized very well. This symmetrization is equivalent to a clearly improved measurement accuracy for the measured value of the rate of flow.

Figure 6:
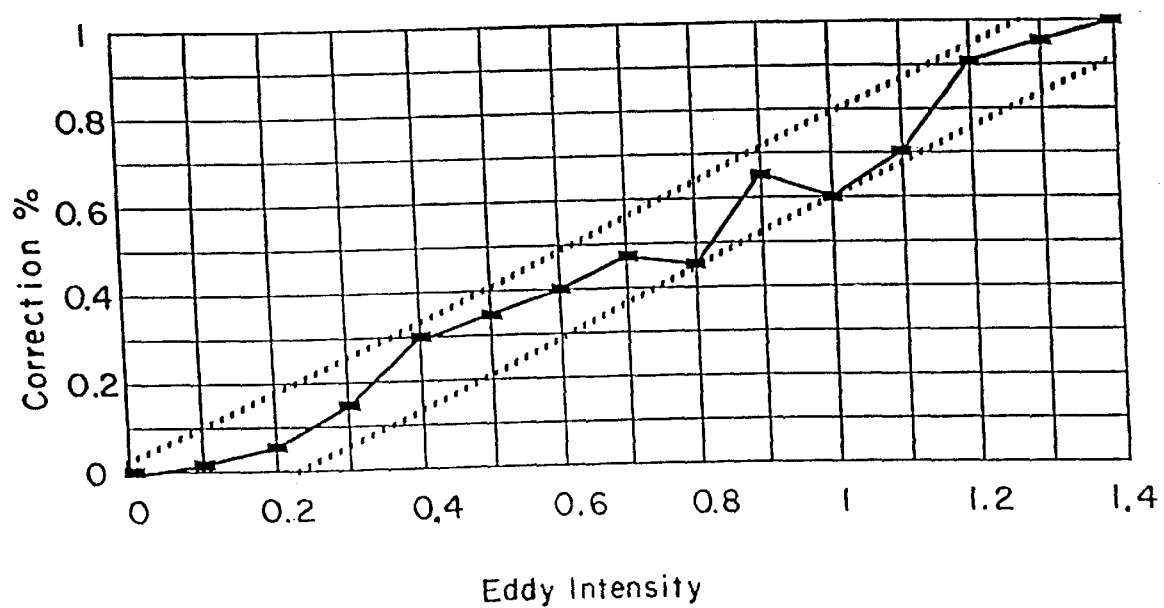
FIG. 6 shows a graphic representation of an empirical error curve for correcting the measured value for the rate of flow.

Finally, the continuous line in FIG. 6 shows the course of an empirically determined error curve for $\delta(S)$ of an arrangement for realizing the method in accordance with the invention. The dotted lines in FIG. 6 enclose the band within which pass the error curves for different designs of an arrangement for realizing the method in accordance with the invention.

In conclusion, it is to be noted again that the method in accordance with the invention provides particularly good results in accordance with the invention first when the measuring tube is mounted at a distance from objects causing disturbances in the adjacent pipeline in which the individual disturbance components have died down. In the publication already cited, "Turbulent Pipe Flow with Swirl", loc. cit., this area is designated as a damping area with respect to the inlet area directly behind the object creating the disturbance.

We claim:

1. An ultrasound flow measuring method comprising the steps of providing a measuring tube and at least two pairs of ultrasound transducers located on the measuring tube in each case forming a measuring path, whereby the radial components of at least two measuring paths deviate from each other with respect to the axis of the measuring tube;

determining from the velocities of a flowing medium along said at least two measuring paths the measured value for the rate of flow of the medium;

determining from the velocities of the medium along said at least two measuring paths the eddy intensity in the medium, the relation between the angular momentum and the axial momentum of the medium also entering into the determination of the eddy intensity; and correcting the measured value for the rate of flow by means of the determined eddy intensity.

2. The method in accordance with claim 1, including the step of carrying out the correction of the measured value for the rate of flow by means of the determined eddy intensity with the use of an error curve based on empirical data.

3. The method in accordance with claim 1 or 2, including the step of determining the angular momentum of the medium at least approximately from the difference or the sum of at least two differences of the velocities of the medium along two measuring paths with radial components deviating from one another with respect to the measuring tube axis.

4. The method in accordance with claim 3, including the step of using the absolute values of the differences of the velocities of the medium along two measuring paths for at least approximate determination of the angular momentum of the medium.

5. The method in accordance with claim 1 or 2, including the step of determining the axial momentum of the medium at least approximately from the velocity of the medium along a measuring path or the sum of the velocities of the medium along several measuring paths.

* * * * *